J. E. McCARTHA.
TRUSS FORMING ATTACHMENT FOR BICYCLE FORKS.
APPLICATION FILED JUNE 25, 1914.
1,159,596.
Patented Nov. 9, 1915.
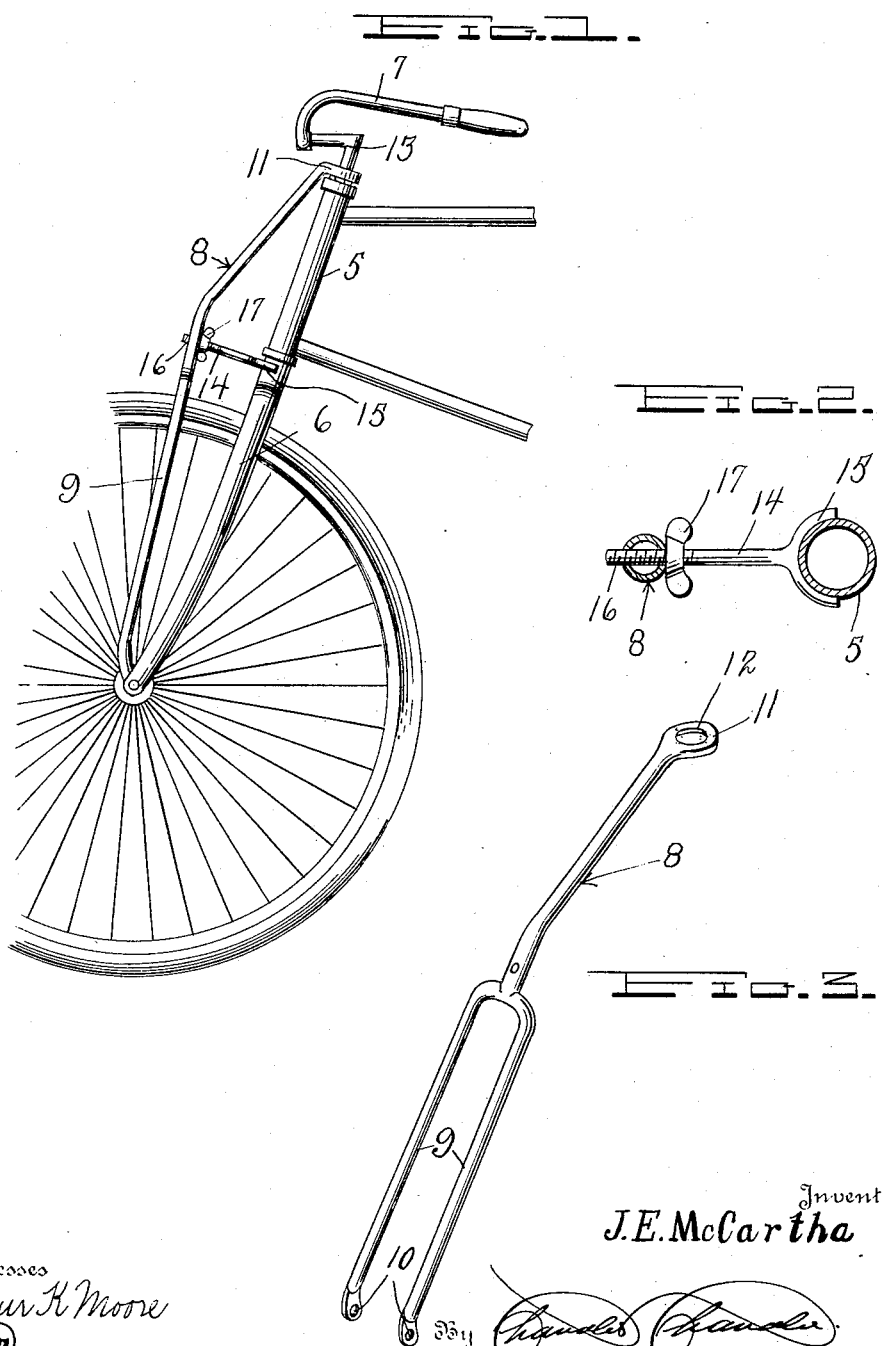
J.E.McCartha

UNITED STATES PATENT OFFICE.

JULIAN E. McCARTHA, OF GILBERT, SOUTH CAROLINA.

TRUSS-FORMING ATTACHMENT FOR BICYCLE-FORKS.

1,159,596.      Specification of Letters Patent.      Patented Nov. 9, 1915.

Application filed June 25, 1914. Serial No. 847,270.

*To all whom it may concern:*

Be it known that I, JULIAN E. MCCARTHA, a citizen of the United States, residing at Gilbert, in the county of Lexington, State of South Carolina, have invented certain new and useful Improvements in Truss-Forming Attachments for Bicycle-Forks; and I do hereby declare the following to be a full, clear, and exact description of the invention, such as will enable others skilled in the art to which it appertains to make and use the same.

This invention relates to bicycles, particularly to the front forks thereof, and has for its object the provision of a trussing device formed as a separate and complete article of manufacture and adapted to be secured upon any make of bicycle in order to form with the existing front fork a trussed construction.

An important object is the provision of a device of this character which is provided with means engaging the head of the frame of the bicycle whereby the device may be set at the proper tension for producing the trussing effect.

Other objects and advantages such as simplicity in construction, cheapness in manufacture, efficiency in use and the general improvement of the art will be carefully brought out in the following description and illustrated in the accompanying drawing, in which—

Figure 1 is a side elevation of the front portion of a bicycle having my trussing member secured thereon. Fig. 2 is a horizontal sectional view through the frame of the bicycle and the trussing member, showing the tension member in top plan, and Fig. 3 is a perspective view of my trussing member detached.

Referring more particularly to the drawing the numeral 5 designates the head of a bicycle frame carrying the usual wheel carrying fork 6 and provided with the usual handle bar 7.

My device is designated as a whole by the numeral 8 and comprises a member bifurcated at its lower end to form spaced parallel arms 9 which are provided with openings 10 at their lower ends for engagement upon the axle of the wheel. At its other end the member is provided with an angular extension 11 which is provided with an opening 12 through which is adapted to pass the shank 13 of the handle bar 7.

In order that the member 8 may be held in the proper relation to the head of the bicycle in order to form an efficient truss, I provide a tension member which comprises a rod 14 provided upon one end with a fork 15 partially embracing the front fork 6 and having its other end 16 extending through an opening formed in the member 8. The rod 14 is screw-threaded and carries an adjusting wing nut 17 thereon, adapted to be turned upon the rod so as to engage firmly against the inner side of the member 8 and thus firmly force the member 8 outwardly so as to secure the proper trussing action in coaction with the fork. The degree of outward tension upon the trussing member 8 may therefore be readily regulated by turning the nut 17.

From the foregoing description and a study of the drawing it will be apparent that I have thus provided a simple and efficient attachment to a bicycle which may be attached to any make of bicycle and which will form with the front fork thereof a rigid truss structure.

It will be readily understood that the right is reserved to make any desired alterations in the minor details of the construction of my device without departing from the spirit of the invention or limiting the scope of the subjoined claims.

Having thus described my invention, I claim:

1. A truss forming attachment for bicycles comprising a bar adapted for removable engagement at one end with the shank of the handle bar, and having its opposite end forked to straddle the front wheel of the bicycle and adapted for connection with the axle thereof, and means connected with the bar and adapted to removably engage the fork crown of the bicycle and strain the bar away from the fork of the bicycle.

2. An attachment to a bicycle comprising a truss forming bar connected at one end upon the axle of the front wheel and revoluble at its other end upon the shank of the handle bar, a member engaging said truss-forming bar and the front fork, and screw actuated means carried by said member for forcing said bar outwardly intermediate its ends relatively to said fork.

3. An attachment to a bicycle comprising a bar formed as a fork, having its forked arms secured upon the axle of the front wheel and having an apertured extension upon its other end extending around the shank of the handle bar, a rod forked at one end for engagement with the front fork of the bicycle and having its other end extending through an opening in the first named bar, and a nut member threaded upon said first named rod and engaging said bar whereby said bar may be forced outwardly intermediate its end relatively to said fork, whereby a truss structure is formed.

In testimony whereof I affix my signature, in the presence of two witnesses.

JULIAN E. McCARTHA.

Witnesses:
SAML. B. GEORGE,
T. C. CALLISAN.

Copies of this trade-mark may be obtained for five cents each, by addressing the "Commissioner of Patents, Washington, D. C."